US008915426B2

(12) United States Patent
Henderson et al.

(10) Patent No.: US 8,915,426 B2
(45) Date of Patent: Dec. 23, 2014

(54) MEDIA DISPENSING SELF-SERVICE TERMINAL

(75) Inventors: Jim Henderson, Fife (GB); John McRobert, Airdrie (GB)

(73) Assignee: NCR Corporation, Duluth, GA (US)

( * ) Notice: Subject to any disclaimer, the term of this patent is extended or adjusted under 35 U.S.C. 154(b) by 222 days.

(21) Appl. No.: 13/546,170

(22) Filed: Jul. 11, 2012

(65) Prior Publication Data

US 2014/0014718 A1    Jan. 16, 2014

(51) Int. Cl.
*G06Q 40/00* (2012.01)

(52) U.S. Cl.
USPC .......................................... 235/379; 235/380

(58) Field of Classification Search
USPC ......... 235/379, 380, 382, 383, 492, 493, 486, 235/487
See application file for complete search history.

(56) References Cited

U.S. PATENT DOCUMENTS

| | | | |
|---|---|---|---|
| 7,992,776 B1 | 8/2011 | Ramachandran | |
| 2004/0139019 A1* | 7/2004 | Cooper | 705/44 |
| 2009/0259588 A1* | 10/2009 | Lindsay | 705/40 |
| 2011/0319016 A1 | 12/2011 | Gormley | |
| 2013/0226799 A1* | 8/2013 | Raj | 705/44 |
| 2013/0238497 A1* | 9/2013 | Ramachandran et al. | 705/41 |

OTHER PUBLICATIONS

Jukka Riekki, et al., NFC-based User Interfaces, Near Field Communication (NFC), 2012 4th International Workshop on, Mar. 13, 2012, pp. 3-9.

* cited by examiner

*Primary Examiner* — Thien M Le
(74) *Attorney, Agent, or Firm* — Joseph P. Mehrle

(57) ABSTRACT

A self-service terminal comprises a media dispenser coupled to a control board; a cryptographic memory coupled to the control board; a network connection; a contact token reader; and a user interface comprising a plurality of lights. The control board includes a processor executing firmware. The firmware is operable to (i) read a token presented to the token reader each time the token contacts the token reader, (ii) ascertain a number of times a token reader is presented as part of a single transaction, (iii) create a transaction request including (a) an identifier read from the presented token and (b) an amount of cash requested based on the number of times the token was presented, (iv) encrypt the transaction request using data read from the cryptographic memory, and (v) transmit the encrypted transaction request to a remote authorization server using the network connection.

15 Claims, 6 Drawing Sheets

MEDIA DISPENSING SELF-SERVICE TERMINAL

FIELD OF INVENTION

The present invention relates to a media dispensing self-service terminal. In particular, although not exclusively, the invention relates to an automated teller machine (ATM).

BACKGROUND OF INVENTION

ATMs provide bank account holders with the most useful source of cash because ATMs are deployed in a large number of locations and are usually accessible on a 24×7 basis. Some ATMs only provide cash dispensing; other ATMs provide a range of different transactions, including cash deposit, cash dispense, check deposit, bill payment, and the like. However, the most popular transaction at an ATM is cash dispensing.

It would be desirable to increase the number of ATMs deployed. One limitation on the number of ATMs that can be deployed is the high cost of each ATM; even if the ATM is limited to cash dispensing (as opposed to cash deposit and/or cash recycling, check deposit, and the like).

A large part of the cost of a cash dispenser arises from the peripheral devices needed (a display, a cash dispenser, a receipt printer, a journal printer, and the like), and also from the software needed to control these peripheral devices (referred to as the platform software, which is effectively an enhanced operating system). Cost is also added because of the software application needed, inter alia, (i) to provide a user interface for customers, replenishers, and service engineers, (ii) to maintain sessions with each customer and with a remote authorization server, and (iii) to maintain the state of the ATM as the transaction flow progresses.

Some low cost cash dispensers have been proposed, such as those described in U.S. Pat. No. 6,659,342 and U.S. Pat. No. 7,577,612.

It would be desirable to provide a cash dispenser that is significantly less expensive than existing cash dispensers, without compromising security.

SUMMARY OF INVENTION

Accordingly, the invention generally provides methods, systems, apparatus, and software for a low cost media dispenser that does not use a keypad for a media dispense transaction.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a self-service terminal comprising:
a media dispenser coupled to a control board;
a cryptographic memory coupled to the control board;
a network connection coupled to the control board;
a contact token reader coupled to the control board;
a user interface comprising a plurality of lights; and
firmware executing on a processor coupled to the control board and operable to (i) read a token presented to the token reader each time the token contacts the token reader, (ii) ascertain a number of times a token reader is presented as part of a single transaction, (iii) create a transaction request including (a) an identifier read from the presented token and (b) an amount of cash requested based on the number of times the token was presented, (iv) encrypt the transaction request using data read from the cryptographic memory, and (v) transmit the encrypted transaction request to a remote authorization server using the network connection.

The media dispenser may comprise a cash dispenser. Alternatively, the media dispenser may comprise a ticket or coupon dispenser, or the like.

The network connection may comprise a modem, such as a cellular radiofrequency modem, an Ethernet card, or the like.

The cryptographic memory may be tamper responsive so that encryption keys are automatically deleted if an attempt is made to compromise the cryptographic memory.

The contact token reader may comprise a near field communication (NFC) reader. A customer may retro-fit a cellular telephone (mobile phone), a bank card, or any other object with an NFC tag having a unique identification. The customer's mobile phone may be retro-fitted by placing an adhesive NFC tag on an outer surface of the mobile phone, or on an inner surface of a battery compartment cover so that the NFC tag is not visible without removing the battery compartment cover. Alternatively, the customer's mobile phone (or other object) may have a built-in NFC tag as a conventional feature (factory-fitted as standard).

The self-service terminal may further comprise a biometrics reader, such as a finger print reader, an iris reader, a palm vein reader, or the like. A customer may present his/her token to the token reader a desired number of times to request a desired amount of money, and then present himself/herself to the biometrics reader so that the biometrics reader captures a reading from a relevant part of the customer, and creates a data template based on the reading. The self-service terminal can then send a transaction request including the data template to the remote authorization server. If the data template matches a data template stored for that customer, then the transaction request can be authorized, subject to financial criteria being met (such as sufficient funds being available).

The plurality of lights may comprise a red light, an amber light, and a green light. The plurality of lights may be provided as either individual lamp elements (such as light emitting diodes (LEDs)), or as a single multi-color lamp element (such as a single multi-color LED).

The red light may indicate that the self-service terminal is out of service (for example, because of a media jam in the dispenser). The amber light may indicate that a transaction cannot be completed (for example, because of insufficient cash in the terminal, or the transaction request was declined either by the remote authorization server or the terminal implementing local rules, such as a maximum dispense amount in any one transaction). The green light may flash each time the token is touched against the token reader, and may illuminate to indicate that a transaction request has been approved.

The user interface may further comprise a media exit indicator that surrounds a media dispense slot defined by the self-service terminal. The media exit indicator may be illuminated (for example, as a green color) when media is being dispensed to highlight the area of the self-service terminal that the customer should interact with to receive the requested media.

The user interface may further comprise a plurality of symbols illuminated by one or more lights. For example, one symbol may depict a tick mark, which is illuminated by a green light to indicate a successful transaction. Another symbol may depict a cross, which is illuminated by a red light to indicate an unsuccessful transaction.

The user interface may further comprise an audio generator such as a loudspeaker. The audio generator may play a sound each time the customer touched his/her token on the token reader, thereby providing the customer with aural feedback. The sound may comprise a short tone for an acceptance condition, and a long tone for an error condition. Alternatively or additionally, the sound may comprise an audio file played through the loudspeaker. The audio file may include words that state whether a transaction has been approved or denied.

The self-service terminal may further comprise a safe enclosing the media dispenser and the control board. Alternatively, a tamper responsive cabinet may enclose the media dispenser and may include media protection activated in response to attempted compromise of the cabinet. The media protection may comprise ink staining, chemical marking, or the like, so that stored banknotes are stained or otherwise indelibly marked in the event of tampering with the terminal.

The firmware may create a virtual private network (VPN) connection between the terminal and the remote authorization server.

According to a second aspect there is provided a method of executing a media dispense transaction, the method comprising:

(i) reading an identification token each time the identification token touches a token reader, (ii) ascertaining a number of times the identification token touches the token reader as part of a single transaction, (iii) creating a transaction request including (a) an identifier read from the identification token and (b) an amount of cash requested based on the number of times the token touched the token reader, (iv) encrypting the transaction request, and (v) transmitting the encrypted transaction request to a remote authorization server.

The method may comprise the further step of emitting an audible sound each time the identification token touches the token reader. The audible sound may be a short beep. Alternatively or additionally, the audible sound may comprise words that provide a current count of the number of times the identification token has touched the token reader during a transaction request.

The method may comprise the further step of momentarily illuminating an LED (for example, a green LED) each time the identification token touches the token reader.

The method may comprise the further step of illuminating an LED (for example, a green LED) in response to an authorized transaction request.

The method may comprise the further step of illuminating an LED (for example, an amber LED) if a transaction-related error occurs (for example, a transaction is declined).

The method may comprise the further step of illuminating an LED (for example, a red LED) if a terminal-related error occurs (for example, the media dispenser has no media left to dispense, or if there is a communications error).

It should now be appreciated that these aspects enable an ultra low cost media dispenser to be provided that is little more than a media dispenser with a token reader and a cellular modem added to it. This avoids the need for a display, an encrypting PINpad, printers, platform software, or application software. It also avoids a user having to provide a personal identification number (thereby reducing the risk of fraud). It improves usability because no text needs to be provided to the user to guide him/her through a transaction. Furthermore, it provides improved access for all users because there is a very small interaction area, and no keyboards or card reader slots have to be reached, which may be difficult for someone in a wheelchair.

According to a third aspect there is provided a self-service terminal comprising:

a controller;

a media dispenser coupled to the controller;

a token reader coupled to the controller;

a network connection coupled to the controller and operable in response to a command received from the controller to connect to a conventional authorization server to authenticate a media dispense transaction that includes a personal identification number entered by the customer; and a cellular modem coupled to the token reader and operable to connect to a second authorization server to authenticate a media dispense transaction requested solely using one or more taps of a token on the token reader.

This aspect has the advantage that a conventional self-service terminal, such as an ATM, can be retro-fitted to include dispensing based on taps of a token by adding a token reader, a cellular modem, and some firmware.

According to a fourth aspect there is provided a method of retro-fitting a self-service terminal to enable the terminal to dispense media in response to taps of a token, the method comprising:

identifying a terminal that does not include a wireless contact token reader;

installing a wireless contact token reader on the terminal;

installing a cellular modem on the terminal;

installing a cryptographic memory on the terminal including secure data; and installing a processor including firmware for (i) reading an identification token each time the identification token touches the wireless contact token reader, (ii) ascertaining a number of times the identification token touches the wireless contact token reader as part of a single transaction, (iii) creating a transaction request including (a) an identifier read from the identification token and (b) an amount of cash requested based on the number of times the token touched the wireless contact token reader, (iv) encrypting the transaction request using the secure data from the cryptographic memory, and (v) transmitting the encrypted transaction request to a remote authorization server using the cellular modem.

According to a fifth aspect there is provided a low-cost media dispenser having a user interface consisting essentially of different colored lamps and a transceiver, where the dispenser ascertains an amount of a transaction request by counting a number of times a customer token is tapped on the transceiver.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
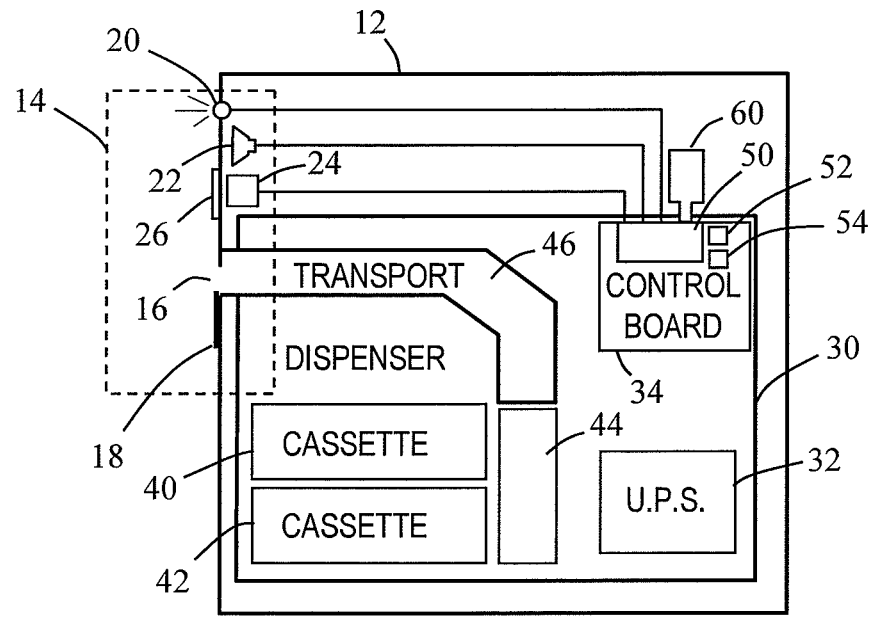
FIG. 1 is block diagram of a media dispensing self-service terminal according to one embodiment of the present invention.

Reference is first made to FIG. 1, which is a block diagram of a media dispensing self-service terminal 10 (in the form of an ATM) according to one embodiment of the present invention.

The ATM 10 comprises a secure casing 12 defining a user interface area 14. The user interface area 14 includes a dispense slot 16 through which banknotes can be dispensed. The user interface area 14 also includes a media exit indicator 18 surrounding the dispense slot 16, a plurality of lights in the form of a tri-color LED 20, a loudspeaker 22, and a contact token reader 24 in the form of a conventional NFC reader. The user interface area 14 also includes a "customer tap" area 26 in front of the NFC reader 24. This customer tap area 26 includes a decal with text stating "Tap here for cash" and an image of a mobile phone and/or a card. This decal is used to alert customers to the area to be tapped to initiate a cash dispense transaction.

The secure casing 12 encloses a media dispenser 30 in the form of a two-high currency dispenser, an uninterruptable power supply 32 for powering the currency dispenser 30, and a control board 34.

The currency dispenser 30 includes two currency cassettes 40,42, and a banknote pick unit 44, and a banknote transport 46 for conveying a picked banknote to the dispense slot 16. The first currency cassette 40 stores a plurality of ten dollar banknotes; the second currency cassette 42 stores a plurality of twenty dollar banknotes.

The control board 34 comprises control components 50 for controlling the dispenser 30, a processor 52 programmed to control the ATM 10, and a cryptographic memory 54 storing cryptographic data (for example, encryption keys) to support creating and maintaining a virtual private network (VPN). The cryptographic memory 54 is tamper responsive so that it will delete cryptographic data if a third party attempts to compromise the cryptographic memory 54.

The control components 50 are conventional and include interfaces, in this embodiment USB interfaces, an audio interface, and an SPI interface, to allow devices to be connected to the control components 50. In this embodiment, a cellular radiofrequency modem 60 is coupled to the control components 50. In addition, the media exit indicator 18, the tri-color LED 20, the loudspeaker 22, and the NFC reader 24 are also connected to the control components 50 via the interfaces.

Figure 2:
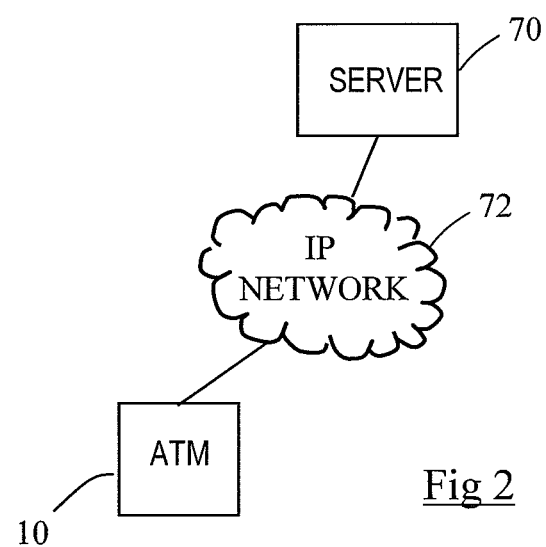
FIG. 2 is a block diagram illustrating the self-service terminal of FIG. 1 coupled to a remote server for authorizing transactions at the self-service terminal.

Reference will now also be made to FIG. 2, which is a block diagram illustrating the ATM 10 coupled to a remote server 70 via an Internet Protocol network 72. As will be discussed further below, the ATM 10 creates a virtual private network (VPN) with the remote server 70 to ensure that communications between the ATM 10 and the remote server 70 are secured.

Figure 3:
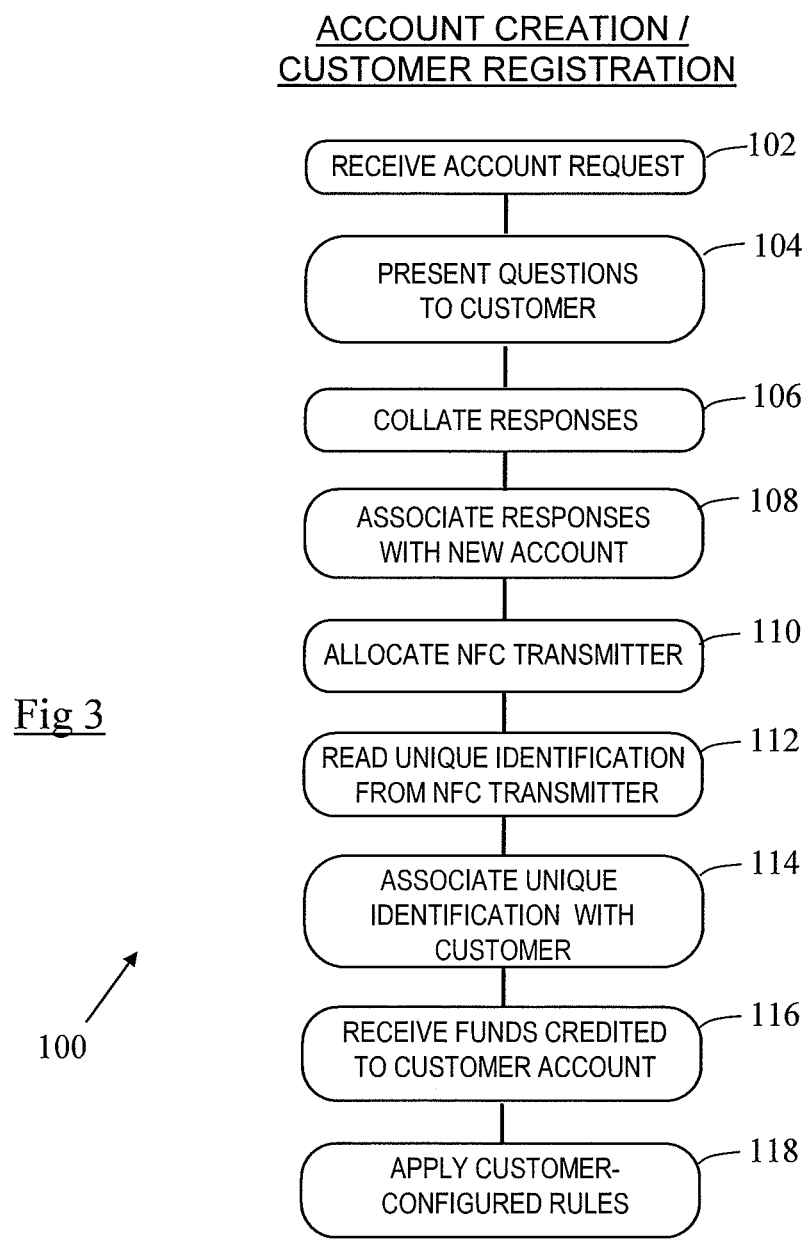
FIG. 3 is a flowchart illustrating steps implemented by a company operating the terminal of FIG. 1 to register a prospective customer of that terminal.

The operation of the ATM 10 will now be described with reference to FIG. 3, which is a flowchart 100 illustrating steps implemented by a company owning and/or operating the ATM 10 to allow a customer to create an account from which cash can be dispensed by the ATM 10.

Initially, the prospective ATM customer (hereinafter "customer") contacts the ATM owner (in this example, a financial institution, but in other embodiments a payment provider or other trusted third party) to create an account. In this example, the customer contacts the financial institution (referred to herein as the operating bank) using a Web site of the operating bank.

The customer then requests a "tap and dispense" account to be created for him/her using the operating bank's Web site. The operating bank receives this request (step 102), and then asks the customer some account related questions via the Web site (step 104). These questions request the customer's name, address, date of birth, and the like. In addition, the customer is requested to provide at least one near-real-time contact mechanism. Examples of a near-real-time contact mechanism includes a cellular telephone number for receiving an SMS message, a cellular telephone number for receiving a voice call from a computer providing computer-generated speech, an email address for receiving an email, an instant messaging address, or the like. The customer is also asked to select at least one of the near-real-time contact mechanisms as the default mechanism for notifying the customer of a transaction.

The operating bank collates these responses (step 106) and associates the responses with a newly created tap and dispense account for the customer (step 108). The operating bank may additionally require the customer to provide photographic identification (such as a passport or drivers' license) and a utility bill including the customer's address and to visit a branch of the operating bank in person so that a member of branch staff can validate the customer's identity.

The operating bank then allocates a near field communication (NFC) transmitter to the customer (step 110), reads a unique identification stored in the NFC transmitter (step 112), and then associates that unique identification with the customer's newly-created account (step 114).

The operating bank then mails the NFC transmitter to the customer. The NFC transmitter is mounted on an adhesive carrier so that the carrier can be adhered to another object.

If the customer is not an existing customer of the operating bank then this will be a new account. If the customer is an existing customer, then this may be a new account or it may be a logical partition of the customer's existing account.

The customer can then transfer money into this new tap and dispense account using a conventional funds transfer feature from another account. Alternatively, the customer may go to a branch of the operating bank and pay cash into the account, or the customer may deposit cash into a cash deposit ATM owned by the operating bank to credit the tap and dispense account. Whichever mechanism is used, the operating bank receives the transferred funds and credits the customer's tap and dispense account (step 116).

The customer may use the operating bank's Web site to configure rules for how this account operates. In this example, the customer sets a maximum daily withdrawal amount of thirty dollars (this period may cover a calendar day or a rolling 24 hour period). The Web site receives this request and applies it to the customer's account (step 118). The operating bank may include default rules that apply in the absence of any customer configured rules. In this embodiment, the default rules limit the daily withdrawal amount to twenty dollars, but the customer can change this in ten dollar increments between ten and fifty dollars (the maximum daily withdrawal).

When the customer receives the NFC transmitter, the customer can then adhere the carrier to an inside surface of a battery compartment of the customer's cellular telephone (or to any other part of the cellular telephone, or to any other object the customer wants to use to enter transaction requests at the ATM 10).

At this stage, the customer's account is ready for use and the customer is ready to conduct a transaction.

To withdraw cash, the customer will tap his/her mobile phone on the ATM 10. Each tap by the customer corresponds to a request for dispensing ten dollars (or some other fixed amount determined by the ATM operator). By tapping multiple times (for example three times) in quick succession, the customer requests dispensing of that multiple of ten dollars (for example thirty dollars for three taps). However, the ATM 10 will only dispense a maximum amount in any one transaction (in this embodiment fifty dollars) and/or on any one day and/or in any twenty-four hour period. Although each tap represents ten dollars, the ATM 10 includes two currency cassettes 40,42, so a request for thirty dollars may be fulfilled using one ten dollar banknote (from the first cassette 40) and one twenty dollar banknote (from the second cassette 42).

Figure 4:
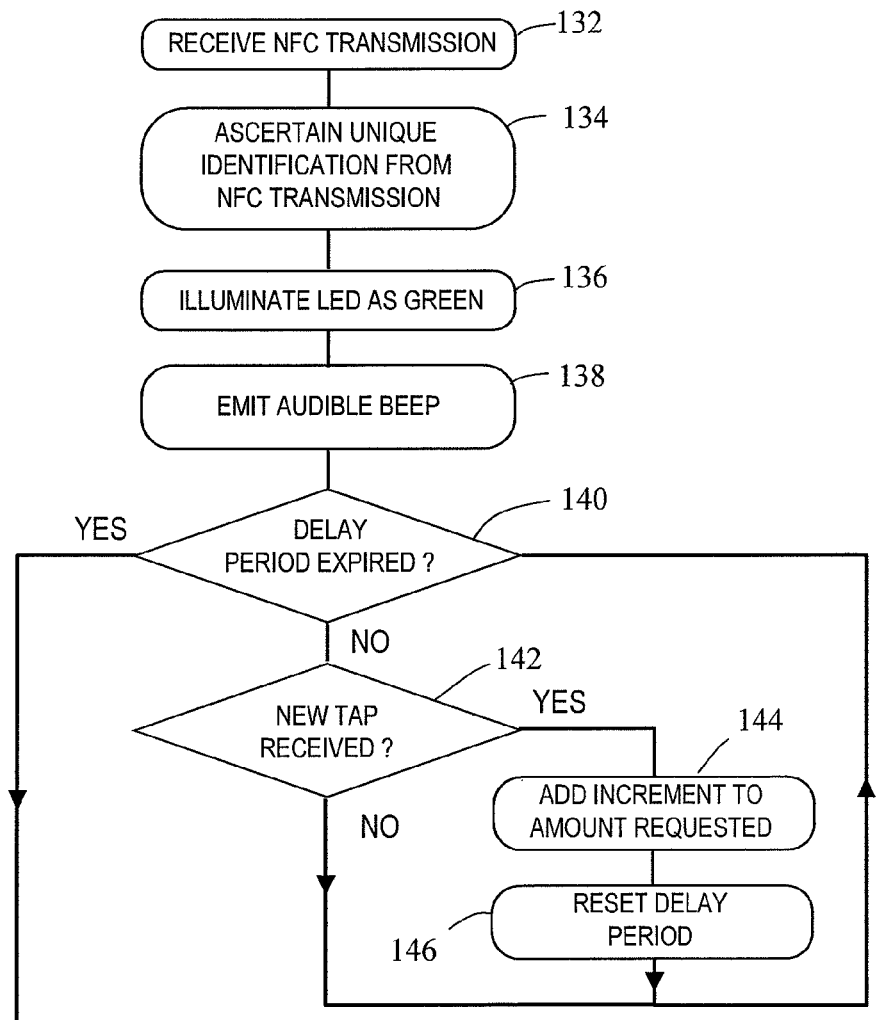
FIG. 4 is a flowchart illustrating steps implemented by the terminal of FIG. 1 to create and transmit a transaction request in response to a customer request.

The operation of the ATM 10 will now be described with reference to FIG. 4, which is a flowchart 130 illustrating steps implemented by the ATM 10 of FIG. 1 to create and transmit a transaction request in response to a customer request to withdraw cash.

Initially, the customer walks (or drives) up to the ATM 10. The customer then taps the rear of his/her cellular telephone (hereinafter "mobile phone") on the user interface area 14. In particular, the customer taps his/her mobile phone on the customer tap area 26.

The NFC reader 24 receives a transmission from the NFC transmitter in the customer's mobile phone (step 132). This transmission includes the unique identification of the NFC transmitter, which the processor 52 in the control board 34 ascertains and stores temporarily (step 134).

The processor 52 then illuminates the tri-color LED 20 so that a green color is temporarily energized (step 136) and emits a short beep through the loudspeaker 22 (step 138). This provides the customer with audible and visual feedback to indicate that the ATM 10 has detected the customer tapping his/her phone.

The processor 52 then waits for a delay period to ascertain if there will be any subsequent taps (step 140). In this embodiment, the delay period is approximately four seconds. If a subsequent tap of the customer's mobile phone is received within the delay period (step 142) (that is, prior to the delay period elapsing), then the processor 52 increments a transaction amount by ten dollars (one tap means ten dollars, a second tap within the delay period means twenty dollars, a third tap within the delay period means thirty dollars, and so on) (step 144) and then resets the delay period (step 146).

The processor 52 continues in this loop (steps 140 to 146) until the delay period expires.

When the delay period expires, the processor 52 creates a transaction request (step 150).

The transaction request includes a transaction amount equal to the number of taps that the ATM 10 received from the customer (where each successive tap was received within the delay period from the previous tap). The transaction request also includes a transaction amount (in this example, thirty dollars) corresponding to the number of taps received by the ATM 10.

The processor 52 also accesses encryption data stored in the cryptographic memory 54 so that the transaction request is encrypted (step 152) for transmission to the remote server 70 using a virtual private network.

The processor 52 transmits the encrypted transaction request to the remote server 70 using the cellular radiofrequency modem 60 (step 154).

Figure 5:
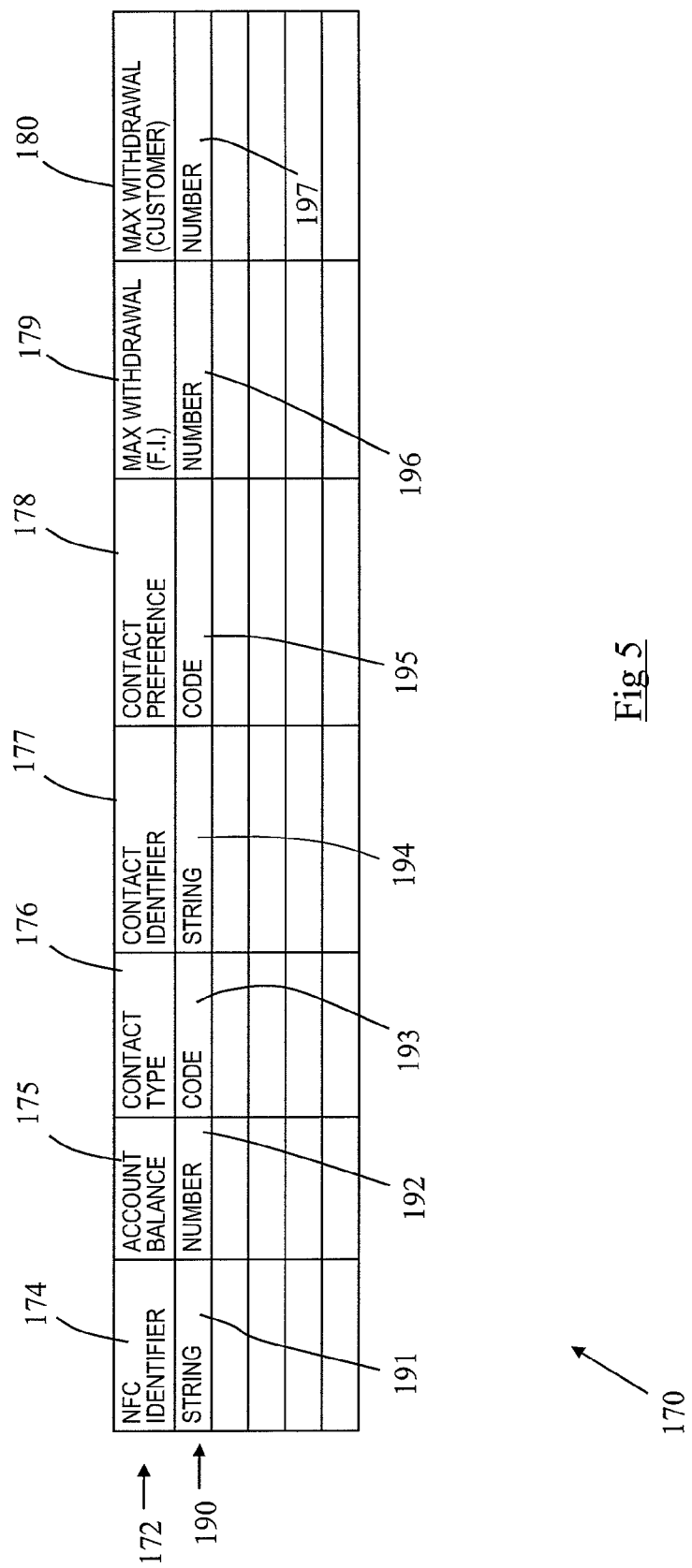
FIG. 5 illustrates a table stored in a memory in the remote server of FIG. 2.

Reference will now also be made to FIG. 5, which illustrates a table 170 stored in a memory (not shown) in the remote server 70, where the table 170 stores account information.

The table 170 comprises a header row 172 including a plurality of columns, each with a respective column header. These column headers include: an NFC identifier 174, an account balance 175, a contact type 176, a contact identifier 177, a contact preference 178, a maximum withdrawal amount as set by the operator of the ATM 10 (the operating bank) 179, and a maximum withdrawal amount as set by the account holder 180. Additional columns may be provided, for example there may be multiple sets of columns 176 and 177, one set for each type of contact (for example, SMS, email, telephone, instant messaging).

Table 170 includes multiple rows (for example, row 190 for a first customer), each row dedicated to a different account.

The first customer row 190 includes an identification cell 191 under column header 174 that includes a numeric/text string corresponding to the unique NFC identification associated with that customer's NFC transmitter.

The first customer row 190 includes a cash balance cell 192 under column header 175 that includes the current balance of the customer's tap and dispense account. This is a numeric field.

The first customer row 190 includes a contact type cell 193 under column header 176 that includes a code indicating the type of contact the customer has registered. For example, this may comprise a code relating to SMS messaging, email, instant messaging, or the like.

A contact identifier cell 194 under column header 177 is associated with the contact type cell 193, and includes a string corresponding to the contact number or contact name of the contact type. For example, this may comprise a telephone number for SMS or telephone, an email address for email, or the like.

A contact preference cell 195 under column header 178 is associated with all of the contact type cells and contact identifier cells that are used (there may be multiple sets of these cells). The contact preference cell 195 indicates the preferred contact method as set by the customer. This may comprise sending a message via all of the contact types registered, or sending a message to only one of the contact types, but if that fails, sending a message to another contact type. Alternatively, there may be preference rules set by the customer that select a contact type based on the time or day. The contact preference cell 195 comprises a code that is interpreted by the server 70 to indicate the preferred contact method selected by the customer. The server 70 interprets the codes by accessing an additional table (not shown) that maps codes from the contact preference cell 195 to the contact type(s).

An ATM-owner-set maximum withdrawal cell 196 under column header 179 indicates the maximum amount that the owner/operator of the ATM 10 is willing any customer to withdraw per day. In this example, the ATM owner is willing to allow up to $60 to be withdrawn each day. In this embodiment, the ATM owner controls all of the ATMs that can dispense cash deducted from the customer's account. For this reason, the customer's account can include a field containing the maximum amount set by the ATM owner. However, in other embodiments, a plurality of ATM owners may control the ATMs that can dispense cash deducted from the customer's account. In such embodiments, the customer's account may not include a field containing the maximum amount set by the ATM owner, unless the plurality of ATM owners all agree on the same maximum daily withdrawal amount.

A customer-set maximum withdrawal cell 197 under column header 180 indicates the maximum amount that the customer (the account holder) will allow to be withdrawn from his/her account per day. In this example, the customer is only willing to allow up to $30 to be withdrawn each day. As a result, this is the maximum that the customer can withdraw in a day, or if the customer's mobile phone is stolen, this is the maximum amount that can be withdrawn in any continuous twenty-four hour period. If the customer's mobile phone is stolen, then the customer should be able to notify the operating bank immediately, which can freeze the tap and dispense account, so that only $30 (the daily withdrawal limit set by the customer) of the customer's money is at risk.

Figure 6:
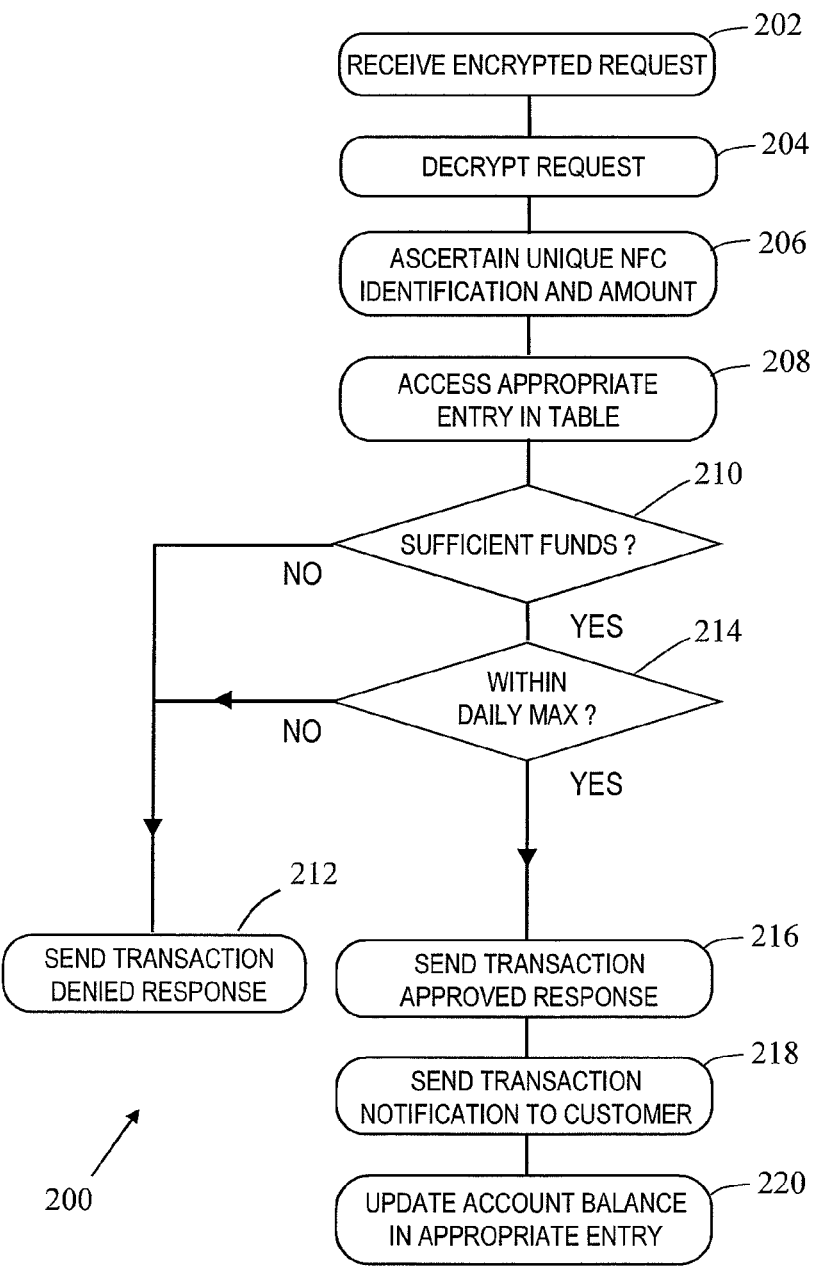
FIG. 6 is a flowchart illustrating steps performed by the remote server of FIG. 2 in response to receiving an encrypted transaction request from the self-service terminal of FIG. 1.

Reference will now also be made to FIG. 6, which is a flowchart 200 illustrating the steps performed by the remote server 70 in response to receiving an encrypted transaction request from the ATM 10.

Initially, the server 70 receives the encrypted transaction request (step 202), decrypts the request (step 204), and ascertains the unique NFC identification from the decrypted request and the amount of cash requested (step 206).

The server 70 then uses the unique NFC identification as a key to access the appropriate row of the table 170 (referred to herein as the "customer row") (step 208). The customer row is the row that includes the ascertained unique NFC identification under the NFC identifier column header 174.

Once the customer row has been identified, the server 70 then ascertains if the customer's account has sufficient funds to cover the dispense request (step 210). This is implemented by ascertaining the account balance from the cell in the customer row under the account balance column header 175.

If the customer's account does not have sufficient funds then the server 70 sends a transaction denied response to the ATM 10 (step 212).

If the customer's account does have sufficient funds to cover the requested transaction, then the server 70 then ascertains if the requested amount exceeds either the operator defined daily maximum (under column header 179) or the customer defined daily maximum amount (under column 180) (step 214).

The transaction request will be denied if at least one of the following conditions occurs: (i) the transaction amount exceeds the operator defined daily maximum amount, or (ii) the transaction amount exceeds the customer defined daily maximum amount, or (iii) the transaction amount, when added to previous transactions executed on the day of the transaction, exceeds either condition (i) or condition (ii). If any of these conditions occur, then the server 70 sends a transaction denied response to the ATM 10 (step 212).

To enable condition (iii) to be checked, the server 70 updates the table 170 (the specific field is not illustrated) with the amount withdrawn each day. This amount is reset at the start of each day.

If none of these three conditions occur, then the server 70 sends a transaction approved response to the ATM 10 (step 216).

The server 70 then sends out a notification of approval of a transaction to the customer's preferred contact mechanism (step 218). This is implemented using the following sub-steps. The server 70 accesses the cell in the customer row under the contact preference column header 178 to ascertain the code indicating the customer's preferred contact mechanism. The server 70 interprets this code (by accessing another table (not shown)). In this example, the code indicates that a text message (SMS) should be sent to the customer's mobile phone. The server 70 then accesses the cell in the customer row under the contact identifier column header 177 to ascertain the customer's mobile phone number. Where multiple customer identifier columns are provided, the cell relating to the customer's mobile phone (in this example) is the cell that is accessed. The server 70 then sends a text message to the customer's mobile phone number including details of the transaction. In this embodiment, the details of the transaction include the time, date, and amount of the transaction. The details of the transaction may also include an amount remaining that can be withdrawn that day (or rolling period) and/or a total amount remaining in the account.

The server 70 then updates the table 170 by decrementing the account balance by the amount approved for dispensing (plus any transaction fee that is applied) and by adding the transaction amount to a daily amount field (not shown) for that customer (step 220).

Figure 7:
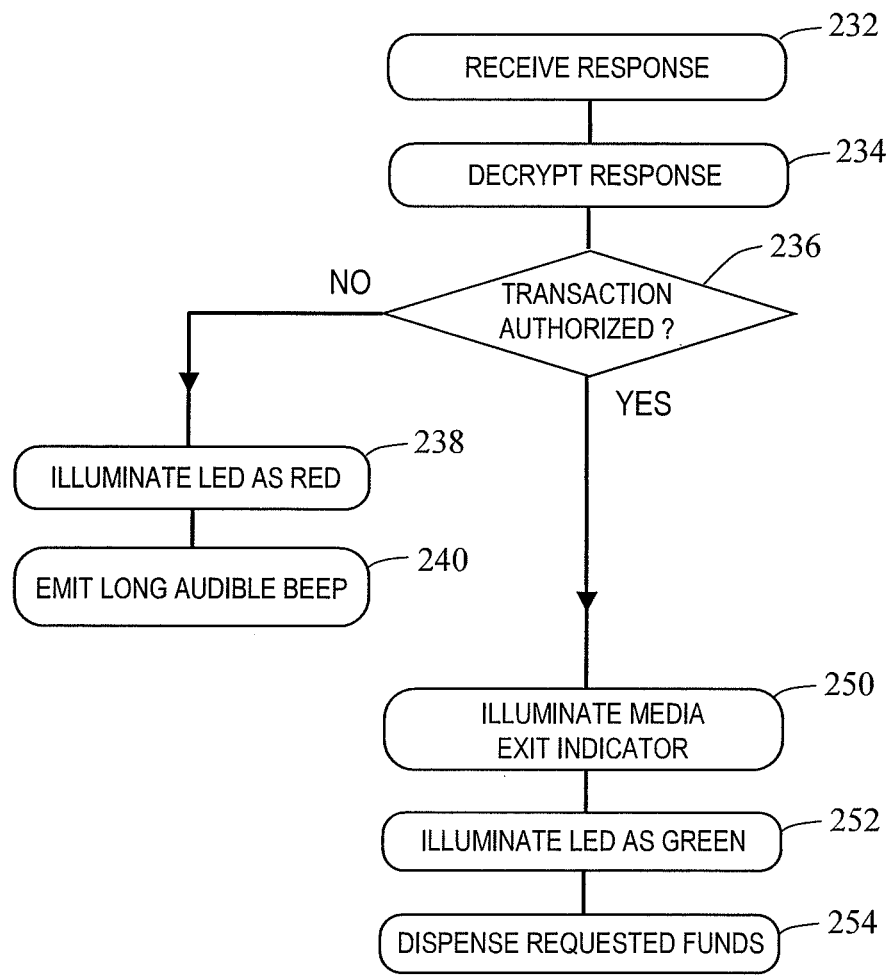
FIG. 7 is a flowchart illustrating the steps implemented by the self-service terminal of FIG. 1 to fulfill the transaction request for the customer.

The fulfillment part of the transaction will now be described with reference to FIG. 7, which is a flowchart 230 illustrating the steps implemented by the ATM 10 to fulfill the transaction for the customer.

The processor 52 in the ATM 10 receives a response from the server 70 (step 232). The processor 52 then decrypts the response (step 234) and ascertains if the server 70 approved or denied the transaction (step 236).

If the transaction was denied by the server 70, then the processor 52 uses the control components 50 to illuminate the tri-color LED 20 so that a red color is temporarily energized (step 238). The processor 52 also emits a long beep through the loudspeaker 22 (step 240). This provides the customer with both visual and audible feedback to indicate that the transaction is denied.

If the transaction was approved by the server 70, then the processor 52 illuminates the media exit indicator 18 surrounding the dispense slot 16 (step 250). This draws the customer's attention to the area at the requested cash (thirty dollars) will be dispensed.

The processor 52 also illuminates the tri-color LED 20 so that a green color is temporarily energized (step 252). Steps 250 and 252 may occur simultaneously.

The processor 52 then uses the control components 50 to dispense the requested cash (thirty dollars) to the customer (step 254), thereby concluding the transaction.

Once the customer has removed the cash, the ATM 10 is then ready for the next customer.

If at any time the ATM 10 needs to go out of service (for example, because of a banknote jam) then the processor 52 illuminates the tri-color LED as a red light. The ATM 10 may also send a message (in this embodiment an out of service message) to either (or both of) the remote server 70 or a remote management centre (not shown) so that the remote management centre can dispatch a service engineer to fix the ATM 10. The out of service message may also include some diagnostic information.

If the ATM 10 does not have enough cash to fulfill a transaction, then the processor 52 illuminates the tri-color LED 20 as an amber light. The ATM 10 also sends a message to the remote server 70 to inform the remote server 70 that the transaction should be reversed because no funds were dispensed. The remote server 70 may send an SMS message to the customer to explain why the transaction was not fulfilled.

It should now be appreciated that this embodiment allows a rudimentary dispenser to be equipped with a modem and a simple user interface and used as a low-cost cash dispenser.

Various modifications may be made to the above described embodiment within the scope of the invention, for example, in other embodiments a different entity may operate the ATM to the entity that owns the ATM.

In other embodiments, the customer may use an NFC transmitter built-into his/her mobile phone. The customer may have to attend a branch of the operating bank to register the unique identification of the NFC transmitter, or a secure mechanism may be used to convey the NFC transmitter identification to the operating bank. For example, the customer may download a mobile phone application (generally referred to as an "app") that allows the customer to convey the NFC transmitter identification (or other token identification being used) to the bank (or other account provider).

In other embodiments, a different object than a phone may be used to carry the token. For example, the object may comprise a card, a wallet, a camera, a purse, a watch, or the like.

In other embodiments, a different wireless technology may be used to NFC, for example, an inductive or capacitive technology.

In other embodiments, if more taps are received than the maximum dispense amount (in this example, five taps), then the processor 52 illuminates the tri-color LED 20 so that an amber (or orange) color is energized for a longer period than the temporary green illumination that indicates that a tap was successfully received. The processor 52 also emits a long beep through the loudspeaker 22. This provides the customer with audio and visual feedback to indicate that the ATM 10 will not execute the requested transaction.

In other embodiments, the tri-color LED may be replaced with a plurality of LEDs, each emitting a different color.

In other embodiments, the table 170 may not store the customer account balance; instead, the table 170 may include a link to another table that stores the customer's account balance.

In other embodiments, the contact token reader 24 may comprise a biometrics reader, such as a fingerprint reader. A customer would first register his/her fingerprint when creating a tap and dispense account. To enter a transaction, the customer would press his/her finger on the contact token reader 24 a desired number of times corresponding to the amount to be withdrawn (for example, three times for thirty dollars).

In other embodiments, the dispense slot 16 may include a sensor for detecting when banknotes have been removed therefrom. The processor 52 may illuminate the media exit indicator 18 surrounding the dispense slot 16 until the dispensed cash is detected as having been removed.

In other embodiments, each tap may correspond to a fixed amount other than ten dollars. For example, each tap may correspond to twenty dollars. In other embodiments, the fixed amount may relate to a currency other than US dollars, for example, Euros, Pound sterling, Yen, or the like.

In other embodiments, the media dispenser may dispense tickets, coupons, or the like instead of, or in addition to, currency.

In other embodiments, the media dispenser may comprise more or less than two currency cassettes. Each cassette may contain the same denomination, or a different denomination. Each cassette may contain the same currency or a different currency.

In other embodiments, the media dispenser may comprise a spray dispenser rather than a bunch dispenser.

In other embodiments, the media dispenser may retract any dispensed cash that is not retrieved by a customer.

In other embodiments, the ATM 10 may include a biometrics reader, such as a fingerprint reader. The table 170 may also include a column for biometrics templates, so that a biometric template is stored for each customer. When the customer enters a transaction, the customer taps the object containing the NFC tag (for example, a mobile phone) on the NFC reader 24 a desired number of times to indicate the amount of cash requested. The customer then places his/her finger on the fingerprint reader. The fingerprint reader captures an image of the customer's finger and creates a biometric template based on that image. The ATM 10 then transmits (after performing encryption) a transaction request including the unique identifier read from the NFC tag, the amount of cash requested, and the biometrics template. The remote server 70 decrypts this transaction request, performs the same authentication steps that are described in FIG. 6, but also compares the received biometrics template with the biometrics template stored in the table 170. If the two templates are a sufficiently close match then the transaction is approved, subject to the other steps in FIG. 6 being satisfied.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A self-service terminal comprising:
a media dispenser coupled to a control board;
a cryptographic memory coupled to the control board;
a network connection coupled to the control board;
a contact token reader coupled to the control board;
a user interface comprising a plurality of lights; and firmware executing on a processor coupled to the control board and operable to (i) read a token presented to the token reader each time the token contacts the token reader, (ii) ascertain a number of times a token reader is presented as part of a single transaction, (iii) create a transaction request including (a) an identifier read from the presented token and (b) an amount of cash requested based on the number of times the token was presented, (iv) encrypt the transaction request using data read from the cryptographic memory, and (v) transmit the encrypted transaction request to a remote authorization server using the network connection.

2. A self-service terminal according to claim 1, wherein the media dispenser comprises a cash dispenser.

3. A self-service terminal according to claim 1, wherein the contact token reader comprises a near field communication reader.

4. A self-service terminal according to claim 1, wherein the plurality of lights comprises a light emitting diode operable to emit a red light, an amber light, or a green light.

5. A self-service terminal according to claim 1, wherein the user interface further comprises a media exit indicator that surrounds a media dispense slot defined by the self-service terminal.

6. A self-service terminal according to claim 1, wherein the user interface further comprises an audio generator.

7. A self-service terminal according to claim 1, wherein the terminal does not include a display capable of rendering changeable text or changeable graphics.

8. A self-service terminal according to claim 1, wherein the network connection is further operable, in response to a command received from the control board, to connect to a conventional authorization server to authenticate a media dispense transaction that includes a personal identification number entered by the customer.

9. A method of executing a media dispense transaction, the method comprising:
   (i) reading an identification token each time the identification token touches a token reader,
   (ii) ascertaining a number of times the identification token touches the token reader as part of a single transaction,
   (iii) creating a transaction request including (a) an identifier read from the identification token and (b) an amount of cash requested based on the number of times the token touched the token reader,
   (iv) encrypting the transaction request, and
   (v) transmitting the encrypted transaction request to a remote authorization server.

10. A method according to claim 9, wherein the method comprises the further step of emitting an audible sound each time the identification token touches the token reader.

11. A method according to claim 9, wherein the method comprises the further step of momentarily illuminating a light emitting diode each time the identification token touches the token reader.

12. A method according to claim 9, wherein the method comprises the further step of illuminating a light emitting diode in response to an authorized transaction request.

13. A method according to claim 9, wherein the method comprises the further step of illuminating a light emitting diode if a transaction-related error occurs.

14. A method according to claim 9, wherein the method comprises the further step of illuminating a light emitting diode if a terminal-related error occurs.

15. A media dispenser having a user interface consisting essentially of different colored lights and a transceiver, where the dispenser ascertains an amount of a transaction request by counting a number of times a customer token is tapped near the transceiver.

* * * * *